United States Patent
Laurence et al.

(10) Patent No.: US 8,923,588 B2
(45) Date of Patent: Dec. 30, 2014

(54) METHOD AND SYSTEM FOR IMPROVED TOF PET RECONSTRUCTION

(75) Inventors: Thomas Laurence, North Royalton, OH (US); Jerome J. Griesmer, Mentor, OH (US); Jeffrey A. Kolthammer, Lyndhurst, OH (US); Andreas Thon, Aachen (DE); Ralph Brinks, Hagen (DE); Carsten Degenhardt, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 1050 days.

(21) Appl. No.: 12/374,374

(22) PCT Filed: Jul. 18, 2007

(86) PCT No.: PCT/US2007/073730
§ 371 (c)(1),
(2), (4) Date: Jan. 21, 2009

(87) PCT Pub. No.: WO2008/011436
PCT Pub. Date: Jan. 24, 2008

(65) Prior Publication Data
US 2009/0324042 A1    Dec. 31, 2009

Related U.S. Application Data

(60) Provisional application No. 60/807,938, filed on Jul. 21, 2006.

(51) Int. Cl.
*G06K 9/00*    (2006.01)
*G01T 1/29*    (2006.01)

(52) U.S. Cl.
CPC .................................. *G01T 1/2985* (2013.01)

USPC .......................................................... 382/131

(58) Field of Classification Search
USPC ................... 382/106, 128, 130, 131, 132, 299
See application file for complete search history.

(56) References Cited

U.S. PATENT DOCUMENTS

| | | | | |
|---|---|---|---|---|
| 4,559,597 A * | 12/1985 | Mullani | ......................... | 600/407 |
| 6,297,506 B1 * | 10/2001 | Young et al. | ................... | 250/369 |
| 6,472,664 B1 | 10/2002 | Kyushima et al. | | |
| 7,399,973 B2 * | 7/2008 | Stark | ......................... | 250/363.08 |

(Continued)

FOREIGN PATENT DOCUMENTS

| CA | 2331108 A1 | 7/2002 |
|---|---|---|
| GB | 2164230 A | 3/1986 |

OTHER PUBLICATIONS

Daube-Witherspoon, M. E., et al.; Influence of Time-of-Flight Kernel Accuracy in TOF-PET Reconstruction; 2006; IEEE Nuclear Science Symposium Conf. Record; pp. 1723-1727.

(Continued)

*Primary Examiner* — Sultan Chowdhury
*Assistant Examiner* — Danell L Owens

(57) ABSTRACT

A time of flight positron emission tomography apparatus (100) includes a detector (106), a data acquisition system (120), a coincidence system (122) and a reconstructor (129). Various elements of an imaging chain influence the temporal resolution of the system (100) so that positron data collected along different lines of response is characterized by different temporal resolutions. The different temporal resolutions are used to estimate the positions of detected events along their respective lines of response.

23 Claims, 3 Drawing Sheets

(56) References Cited

U.S. PATENT DOCUMENTS

| | | | |
|---|---|---|---|
| 2004/0195512 A1* | 10/2004 | Crosetto | 250/363.04 |
| 2006/0027755 A1* | 2/2006 | Tai | 250/363.03 |
| 2006/0192128 A1* | 8/2006 | Benlloch Bavciera et al. | 250/369 |
| 2007/0106154 A1* | 5/2007 | Conti | 600/436 |
| 2009/0018438 A1* | 1/2009 | Schroder et al. | 600/431 |

OTHER PUBLICATIONS

Wong, et al., Image Improvement and Design Optimization of the Time-of-Flight PET, The Journal of Nuclear Medicine, 1983, pp. 52-60, vol. 24, No. 1.

W.W. Moses, Application of new detector technology to PET, Proceedings of the Physics of Medical Imaging, 1993, pp. 51-62, http://breast.lbl.gov/~wwwinstr/publications/Papers/UCLA.pdf.

Moses et al., Gamma Ray Spectroscopy and Timing Using LSO and PIN Photodiodes, IEEE Transactions on Nuclear Science, 1995, pp. 597-600, NS 42.

Zhang et al., A Prototype Modular Detector Design for High Resolution Positron Emission Mammography Imaging, IEEE Transactions on Nuclear Science, Oct. 2003, pp. 1624-1629, vol. 50, No. 5.

Maniawski et al., Will "time of flight" deliver breakthrough performance in clinical PET imaging, as published in IHE Max, 2006.

* cited by examiner

METHOD AND SYSTEM FOR IMPROVED TOF PET RECONSTRUCTION

CROSS REFERENCE TO RELATED APPLICATIONS

This application claims the benefit of U.S. provisional application Ser. No. 60/807,938 filed Jul. 21, 2006, which is incorporated herein by reference.

The present invention relates to positron imaging, and more particularly to time of flight (TOF) positron emission tomography (PET). While it finds particular application to positron emission tomography in medicine, it also finds application to positron emission tomography in pre-clinical and other non-medical environments as well as to other situations in which TOF information is utilized.

Positron emission tomography (PET) is a branch of nuclear medicine in which a positron emitting radiopharmaceutical is introduced into the body of a patient or other object under examination. As the radiopharmaceutical decays, positrons are generated. A generated positron reacts with an electron in what is known as a positron annihilation event, thereby generating a coincident pair of 511 keV gamma rays which travel in substantially opposite directions along a line of response (LOR). A gamma ray pair detected within a coincidence time interval is ordinarily recorded by a PET scanner as a positron annihilation event. In a typical scan many millions of such annihilation events are detected and used to generate images and other information indicative of the distribution of the radionuclide in the object.

PET systems are widely used in connection with the diagnosis and treatment of disease, for example in oncology, cardiology, functional studies, and other applications. Due to limitations in scintillator response time and other factors, conventional PET systems did not collect time of flight information. Thus, the reconstructor was provided without any, information about the location of an event along an LOR. While non-TOF systems have been widely used in medical and other applications, the quality of the resultant image data has been relatively limited.

More recently, TOF PET systems have become available. In TOF PET, the time difference between the detection of two coincident gamma rays is measured and used to provide information indicative of the location of events detected along the various LORs. One factor that influences the performance of a practical TOF PET system, however, is the temporal resolution of the time of flight measurement. As practical systems have a finite temporal resolution, the event locations cannot be measured with certainty. Consequently, the locations of the various events have been estimated as having occurred within a range of locations along their respective LORs. More specifically, a temporal resolution value has been applied on a global or system-wide basis to estimate the locations of events detected along the various LORs. These global estimates are used in the reconstruction process to improve the quality of the resultant images.

For a given activity level and imaging time, TOF systems generally produce images having a relatively higher quality than comparable non-TOF systems. Viewed from another perspective, images having comparable quality can be obtained using a relatively lower activity level and/or a shorter imaging time.

While TOF systems have proven to be effective in providing relatively higher image quality than conventional non-TOF systems, there remains room for improvement. More particularly, it remains desirable to utilize the time of flight information from a given system still more effectively and hence further improve the quality of the resultant image data.

Aspects of the present address these matters and others.

In accordance with one aspect of the present invention, a method of time of flight positron emission tomography includes estimating a position of a first positron annihilation event based on a first temporal resolution, estimating a position of a second positron annihilation event based on a second temporal resolution, and using the estimated positions to reconstruct image data indicative of the positron annihilation events. The second temporal resolution is different from the first temporal resolution.

According to another aspect, a time of flight positron emission tomography apparatus includes means for using a first temporal resolution value to estimate a position of a first positron annihilation event, means for using a second temporal resolution value to estimate a position of a second positron annihilation event, and a reconstructor 129 which uses the estimated positions to reconstruct image data indicative of the positron annihilation events. The second temporal resolution is different from the first temporal resolution.

According to another aspect, a computer readable storage medium containing instructions which, when carried out by a computer, cause the computer to carry out a method. The method includes the steps of obtaining second order temporal data for a plurality of positron annihilation events, where the second order temporal data includes at least first and second different values. The method also includes using the second order temporal data to reconstruct image data indicative of the positron annihilation events.

According to another aspect of the invention, an apparatus includes a gamma radiation sensitive detector, a coincidence detector operatively connected to the radiation sensitive detector, a memory containing data indicative of the temporal resolution of the detector at a plurality of locations on a radiation sensitive face of the detector, and a reconstructor operatively connected to the coincidence detector and the memory. The reconstructor uses a list mode reconstruction technique and temporal resolution data from the memory to generate image data indicative of positron annihilation events identified by the coincidence detector.

According to another aspect of the invention, a method includes replacing a component of a time of flight positron emission tomography system and updating a temporal resolution value contained in memory of the system. The component influences a temporal resolution of the system, and the memory contains a plurality of temporal resolution values.

Still further aspects of the present invention will be appreciated by those of ordinary skill in the art upon reading and understand the following detailed description.

The invention may take form in various components and arrangements of components, and in various steps and arrangements of steps. The drawings are only for purposes of illustrating the preferred embodiments and are not to be construed as limiting the invention.

Figure 1:
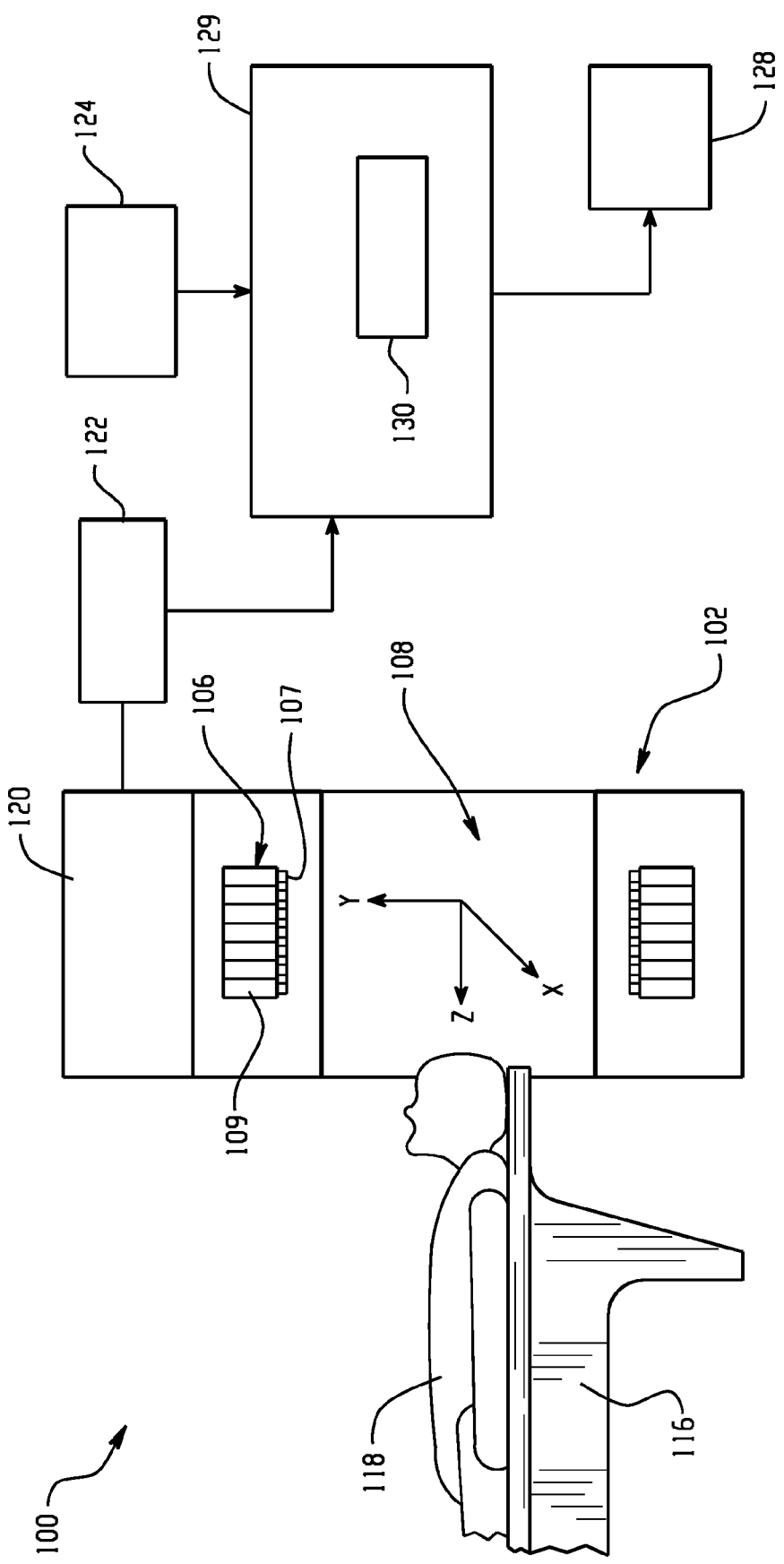
FIG. 1 depicts a TOF PET imaging system.

With reference to FIG. 1, a PET system 100 includes a gantry 102 and a radiation sensitive detector 106. As will be discussed in more detail below, the detector 106 may exhibit significant variations in timing accuracy, for example from one region of the detector to another, from one component to another, and even from one scintillator crystal (or crystal region) to another. While accounting for temporal resolution on a system-wide basis provides an adequate description of the average behavior, local and individual properties of the detector elements are lost. Consequently, it is desirable to more accurately account for these varying detector properties.

The detector 106, which is disposed in a generally cylindrical arrangement about an examination region 108, also extends along a longitudinal or z-axis. The detector 106 includes a scintillator 107 which converts the 511 KeV gamma rays characteristic of positron annihilation events into flashes of light. Photodetectors 109 disposed in optical contact with the scintillator 107 detect the scintillations and generate corresponding electrical signals. As the temporal resolution of the system 100 is directly related to the time response of the scintillator 107, photodetectors 109, and other components of the detector 106, the detectors 106 are advantageously fabricated from scintillator materials 107 and photodetectors 109 having a relatively fast time response. One suitable scintillator material is lutetium yttrium ortho-silicate (LYSO); suitable photodetectors include photomultiplier tubes (PMTs) and silicon photomultipliers (SiPMs). Other scintillator materials 107, photodetectors 109, and detector 106 configurations may also be implemented depending on application specific requirements.

An object support 116 supports a human patient or other object to be imaged 118 in the examination region 108. The object support 116 is advantageously movable relative to the examination region 108 in coordination with operation of the PET system 100 so as to facilitate positioning of the object 118 and to allow scanning of the object 118 at a plurality of discrete or continuously moving axial locations as desired.

A data acquisition system 120 generates information indicative of the various gamma photons detected by the detector 106. Such data may include one or more of information regarding the location on the detector 106 at which a gamma photon was detected, the photon energy, a detection time stamp, the photon depth of interaction (DOI), count rate, and the like. Again, the characteristics of the various components of the data acquisition system 120 can influence the timing measurements and thus the system 100 timing resolution.

A coincidence system 122 receives the information from the data acquisition system 120 and identifies those detected gamma photons which result from positron annihilation events. The coincidence system 122 also generates event data for each of the various events. The event data, which is advantageously generated in a list mode, typically includes an LOR position or coordinate, TOF information such as a most likely position (MLP), and other desired information for each event or counts.

A reconstructor 129 includes a computer processor 130 which executes computer readable instructions carried on a volatile, non-volatile, or other computer readable memory accessible to the processor 130. The reconstructor 129 reconstructs the event data to generate image data indicative of the detected annihilations, for example using a suitable iterative or analytical reconstruction algorithm. The reconstructor 129 also accesses temporal resolution data 124 stored in a suitable memory or which is otherwise accessible to the reconstructor 129 in connection with the reconstruction process. As will be described in more detail below, the reconstructor 129 uses the temporal resolution data 124 to account for variations in temporal resolution among the various components in the data acquisition chain.

A workstation computer serves as an operator console 128 and includes human readable output devices such as a monitors or displays and input devices such as a keyboard and/or mouse. Software resident on the console 128 allows the operator to control the operation of the scanner 100 by establishing desired scan protocols, initiating and terminating scans, viewing and otherwise manipulating the image data, and otherwise interacting with the scanner 100.

While the above discussion has focused on a PET system, the system 100 may also include one or more additional imaging modalities, for example in a hybrid PET/CT, PET/MR, or other system.

Figure 1A:
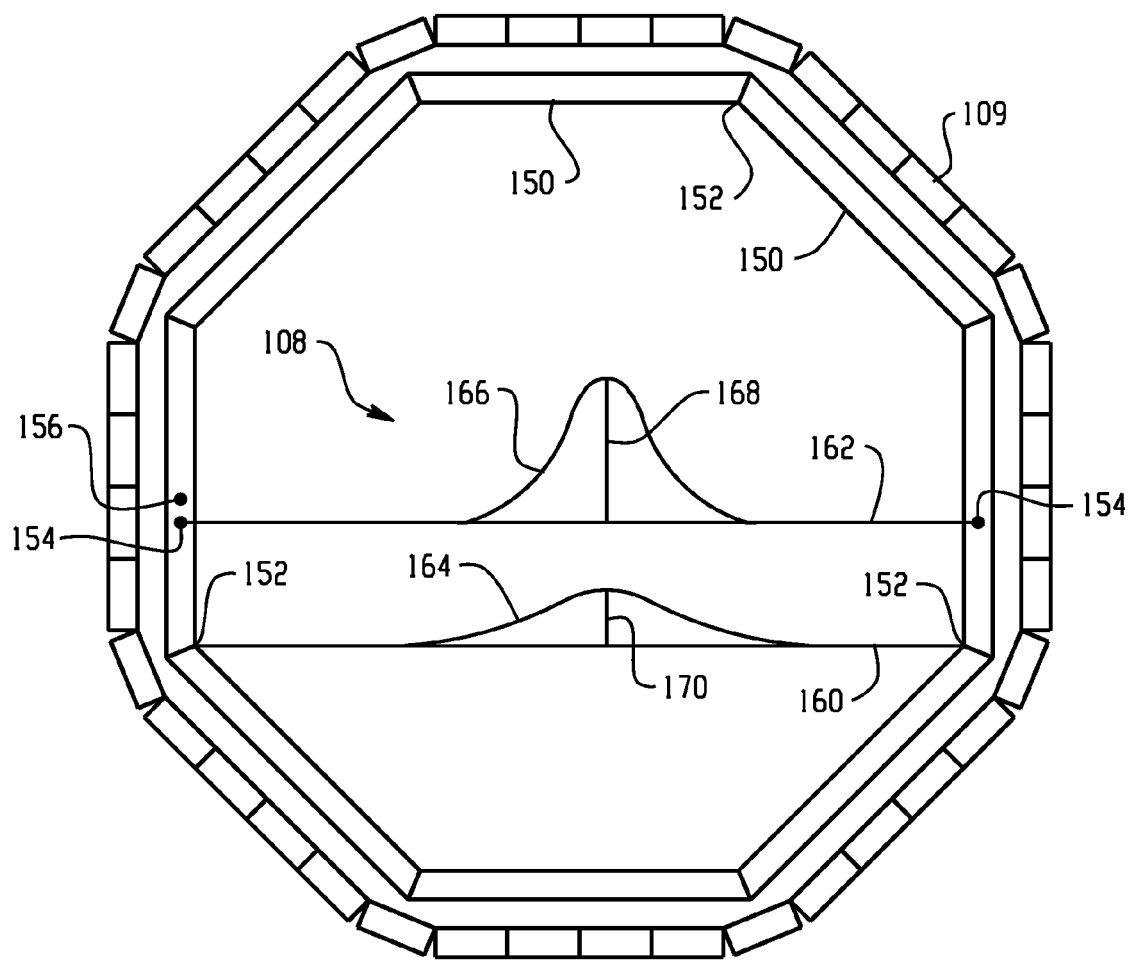
FIG. 1A is a transaxial view of a PET detector.

FIG. 1A depicts a transaxial view of one exemplary detector 106 configuration. As illustrated, a plurality of pixelated scintillator modules 150 is disposed about the examination region 108. Arrays of photomultiplier tubes (PMTs) 109 detect the scintillation photons generated by the scintillators 150. While FIG. 1A depicts a detector 106 having eight (8) scintillator modules 150 in an exaggerated scale for simplicity of illustration, it will be appreciated that a practical detector 106 may include as many as twenty eight (28) or more scintillator modules 150 disposed about the examination region 108.

As illustrated in FIG. 1A, interface or gap regions 152 are located between the scintillator modules 150. Moreover, some portions 154 of the scintillator modules 150 are located relatively nearer to the transverse center of a PMT 109, while still other portions 156 are located relatively further therefrom.

As temporal resolution of the detector 106 is a function of factors such as the light collected by the PMTs and the response of a given scintillator 150-PMT 109 combination to gamma stimuli, the interfaces 152, proximity to PMT centers, and other geometric factors can cause variations in temporal resolution across the radiation sensitive face of the detector 106. For example, regions in the vicinity of the interfaces 152 and regions 156 relatively farther from PMT centers typically have a relatively worse temporal resolution, while regions 154 located relatively nearer to PMT centers typically have a relatively better temporal resolution.

Temporal resolution of the detector 106 may also be influenced by variations in the components of the detector 106 and other elements of the imaging chain. For example, the scintillator 150 or the photodetectors 109 may exhibit piece-to-piece or lot-to-lot time response time variations. Similar variations may be exhibited by reactive and other electrical components in the data acquisition system 120. Indeed, variations in the assembly process and even in the placement of electrical signal leads can also cause such variations.

Temporal resolution can also be influenced by dynamic or measurement-specific factors. Thus, for example, temporal resolution may also vary as a function of the gamma photon DOI, photon energy, temporal and/or location specific variations in the count rate, and other similar factors.

The effect of these variations is shown in FIG. 1A with respect to exemplary first 160 and second 162 LORs. The first LOR 160 represents an annihilation event in which the corresponding gamma photons are detected relatively near to interfaces 152 and hence exhibit relatively poor temporal resolution. The second LOR 162 represents an annihilation event in which the corresponding gamma photons are detected at a location relatively near to the centers 154 of respective PMTs and hence exhibit a relatively good time resolution.

More particularly the illustrated position estimates 164, 166 are characterized by zeroth, first, and second order temporal information. The zeroth order temporal data represents the area under the respective curves 164, 166. The first order temporal data represents the MLP 168, 170 of the detected events, as is ordinarily determined from the respective TOF measurements. The second order temporal data represents the certainty or width of the position estimate, and is a function of the temporal resolution. Where the position estimates 164, 166 are represented as Gaussian functions, the second order temporal data may advantageously be expressed in terms of the full width half max (FWHM) of the position estimate.

In the illustrated example, the zeroth order temporal data for both the first 164 and second 166 position estimates has the same value, as would ordinarily be the case when events detected on the various LORs 160, 162 are afforded an equal weight. The first order data represents the MLPs of the respective events. The second order temporal data reflects variations in temporal resolution among the LORs. In the illustrated example, the second position estimate 168 has a relatively better temporal resolution and thus exhibits a smaller or narrower FWHM than the first position estimate 170.

While foregoing has described the variation in the position estimates 164, 166 in relation to the geometric or structural characteristics of the detector 106, the position estimates 164, 166 can also be influenced by inter-component variations, dynamic or measurement-specific variations, and other variables, either alone or in combination. Thus, for example, one or more of the PMTs 109 located near the interfaces 152 may have a relatively better temporal characteristics than other PMTs 109 in the system, thus ameliorating some of the variations in temporal resolution that would otherwise be expected. Of course, the opposite is also true.

Figure 2:
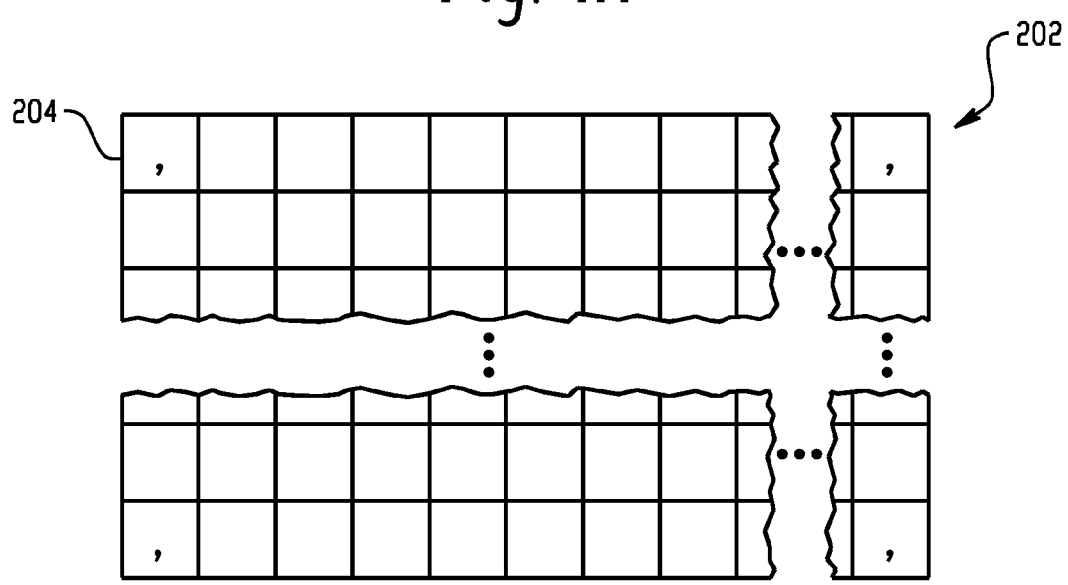
FIG. 2 is a representation of second order temporal resolution data.

The second order temporal data can be used to improve the quality of the image data generated by the PET system 100. With reference to FIG. 1 and additional reference to FIG. 2, temporal resolution data 124 indicative of the temporal performance of a particular detector 106 is stored in a computer readable memory or in other suitable form. The temporal resolution data 124 may be visualized as being stored in a two-dimensional lookup table 202 which is accessed based on an x,y position on the face of the detector 106. In the illustrated case of a pixelated scintillator module 150, each element 204 in the table 202 may represent the timing resolution of each of the various scintillator module 150 pixels. As another example, the temporal resolution data 124 may be organized based on pixel index, or on a location or coordinate of a particular LOR or group of LORs. Of course, the above are only two possible techniques for visualizing and accessing the data; other structures may be implemented.

As will be appreciated by those of ordinary skill in the art, the temporal resolution data 124 may be readily incorporated into the reconstruction, which uses the proper second order temporal value for each count. Such incorporation is especially straightforward in connection with list mode reconstruction, as the differing values are more readily accommodated. While the temporal resolution data 124 may also be used in connection with histogram-based reconstructions, the implementation tends, as a practical matter, to be relatively more complex.

Variations are contemplated. For example, the second order temporal data 124 may be provided at various levels of granularity. For example, the data 124 may be provided at a relatively lower spatial resolution, for example for regions including two or more scintillator module 150 pixels. The data 124 may also be provided in relation to still larger regions of the detectors. For example, the data 124 may be used to adjust only for relatively larger or geometric variations in the detector 106, for example an expected variation in the interface regions 152.

Thus, the temporal data 124 may be established based on an a priori knowledge of the system 100 structure and its expected temporal performance characteristics. The temporal data 124 may also be established on the measured values for a particular system 100 or its relevant components, for example as obtained during a calibration procedure which is performed as part of the system manufacturing or installation process, from time-to-time during the operational life of the system 100, when replacing one or more components which might be expected to alter the temporal performance of the system 100, or at other desired times.

Also as noted above, temporal resolution depends on the data rate. Thus, as the activity of an isotope in increased, the singles rate likewise increases as additional gamma photons are received at the detector 106. The resultant increase in signal pile-up tends to degrade the temporal resolution. Thus, the temporal resolution tends to be influenced by activity. This temporal resolution activity dependence can be determined by obtaining temporal resolution information at two or more activity levels. The resultant data can be stored in the lookup table 202 (either alone or in combination with the second order temporal data, for example in a multi-dimensional table). The temporal resolution activity dependence may also be approximated by a linear or other function stored in the memory or otherwise and which is used to adjust the second order data 124 based on the then-current activity rate. Again, the resultant temporal data can be incorporated in the reconstruction either alone or in combination with detector or measurement-specific data.

Moreover, differences in temporal resolution can be predicted based on the particulars of a given imaging examination, for example where different patients are given different doses of radioactive markers, for different patient sizes (as larger patients generate different amounts of scatter), as a function of time following introduction of the maker, and for different isotopes (as short lived tracers generally result in higher data rates). In the later case, the temporal resolution may even change during the course of a given imaging examination. For a fast decaying tracer (e.g., Rb-82, which has a half-life of about 1.27 minutes), the rates can change significantly during the scan, with a concomitant change in temporal resolution. This variation can be particularly significant in dynamic studies in which a time series of images are generated. In the latter case, a different temporal resolution may be used for each image.

The zeroth order data may be varied as a function of the second order data. In some situations, for example, it may be desirable to apply a relatively higher weighting to regions or data acquired at a relatively higher temporal resolution (or stated conversely, to de-weight detector pixels or regions which exhibit a relatively poor temporal resolution).

As yet another alternative which is especially useful for simplifying servicing of or upgrades to the system 100, one or more field replaceable units (FRUs) which affect the system 100 temporal performance are provided with a memory containing FRU-specific temporal data. Thus, for example, detector modules (e.g., a photodetector 106-scintillator 107 combination), one or more desired portions of the data acquisition system 120, or other field replaceable components of the data acquisition chain may be provided with their own memory. In such an implementation, the second order or other temporal characteristics of the relevant component(s) may be measured during the manufacturing process. The desired values are downloaded, obtained during operation of the system 100, or otherwise obtained following installation of the relevant FRU.

Other arrangements of the detector 106 are also possible. While the foregoing discussion focused on the use of pixelated scintillators 107, non-pixelated or homogeneous scintillators may be used. Examples of alternative scintillator crystal materials include lutetium orthosilicate (LSO), cerium doped lutetium yttrium orthosilicate (LYSO), cerium-doped lutetium yttrium aluminum perovskite (LuYAP), cerium-doped lutetium aluminum perovskite (LuAP), lutetium gadolinium oxyorthosilicate (LGSO), lanthanum bromide (LaBr), lanthanum chloride (LaCl), cerium-doped gadolinium orthosilicate (GSO), bismuth germinate (BGO), and mixtures thereof. Alternate photodetectors 109 include silicon drift photodiodes, visible light photon counters (VLPC's), and other silicon photodetectors. Direct conversion detectors such as cadmium telluride (CdTe), cadmium zinc telluride (CZT), or the like are also contemplated. Moreover, the detector 106 need not be implemented in modular fashion, and different physical arrangements of the detector 106 and its constituent elements may be implemented based on application specific requirements. Still other alternatives will be appreciated by those of ordinary skill in the art.

Figure 3:
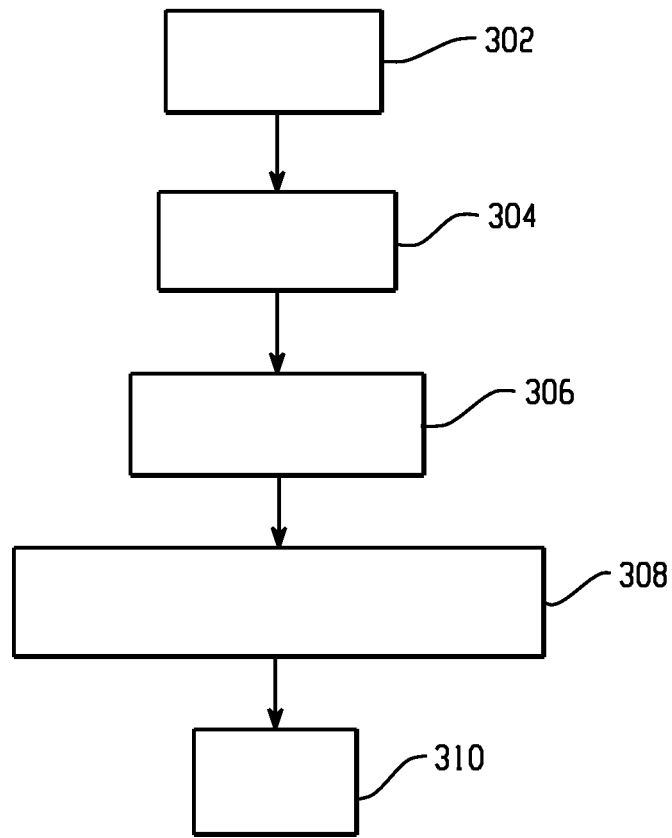
FIG. 3 depicts an imaging method.

Operation of the imaging system 100 in connection with an exemplary imaging examination will now be described in connection with FIG. 3.

An object under examination 118 is placed in the examination region 108, and image data is acquired at step 302.

At step 304, the coincidence system 122 identifies coincident gamma photons, and list mode event data is generated at step 306.

The event data is reconstructed at step 308. More particularly, the second order or other temporal data is used to estimate the position of the events along their respective LORs as described above.

A human readable image indicative of the reconstructed data is generated at step 310.

In this regard, it should be noted that steps 304, 306, 308, and 310 may, but need not, be performed substantially in parallel with step 302. Thus, for example, these steps may be performed at a desired time period following completion of the data acquisition.

Figure 4:
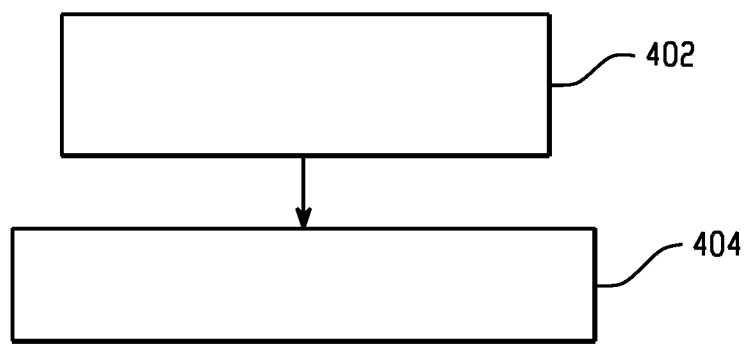
FIG. 4 depicts a method of replacing a component of a time of flight positron emission tomography system.

A method of replacing a component of a time of flight positron emission tomography system is shown in FIG. 4. At 402, the desired component is replaced, for example to replace a malfunctioning component or to upgrade the system following installation of the system at an end-user location. The component influences a temporal resolution of the system. At 404, a temporal resolution value contained in memory of the system is updated.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A method of time of flight positron emission tomography comprising the steps of:
   estimating a position of a first positron annihilation event, during a first scan, along a first line of response based on a first temporal resolution corresponding to the first line of response;
   estimating a position of a second positron annihilation event, during the first scan, along a second line of response based on a second temporal resolution corresponding to the second line of response, wherein the first temporal resolution and the second temporal resolution are indicative of at least one detector and are calculated before beginning the first scan, wherein the second temporal resolution is different from the first temporal resolution, the second line of response is different from the first line of response, and the second line of response is parallel to the first line of response; and
   using the estimated positions to reconstruct image data indicative of the first and second positron annihilation events.

2. The method of claim 1 including generating list mode data indicative of the first and second positron annihilation events, and wherein the step of using includes using a list mode reconstruction technique to reconstruct the image data.

3. The method of claim 1 wherein estimating the position of a first positron annihilation event includes estimating a position of the first positron annihilation event along a first line of response and estimating the position of a second positron annihilation event includes using estimating a position of the second positron annihilation event along a second line of response.

4. The method of claim 1 wherein the first positron annihilation event is measured using a time of flight positron emission tomography scanner and the first temporal resolution is a function of a measured temporal resolution of the scanner.

5. The method of claim 1 wherein the first positron annihilation event is measured using a radiation sensitive detector and the first temporal resolution is established based on a geometric characteristic of the detector.

6. The method of claim 1 including obtaining the first and second temporal resolutions from a memory.

7. The method of claim 6 wherein the memory includes one of temporal resolution values for each of a plurality of locations on a pixelated scintillator and temporal resolution values for each of a plurality of lines of response.

8. The method of claim 1 wherein the first and second temporal resolutions are a function of at least two of a measured temporal resolution, a geometric characteristic of a radiation sensitive detector, and an event data rate.

9. The method of claim 1 including
   measuring a first photon depth of interaction;
   using the measured first photon depth of interaction to establish the first temporal resolution.

10. A time of flight positron emission tomography apparatus comprising:
    means for using a first temporal resolution value corresponding to a first line of response to estimate a position of a first positron annihilation event along the first line of response; wherein the first positron annihilation event is detected by first and second detectors of a single detector ring;
    means for using a second temporal resolution value corresponding to a second line of response to estimate a position of a second positron annihilation event along the second line of response, wherein the second temporal resolution value is different from the first temporal resolution value, the second line of response is different from the first line of response, and the second line of response is parallel to the first line of response, wherein the second positron annihilation event is detected by the first and second detectors of the single detector ring; and
    a reconstructor which uses the estimated positions to reconstruct image data indicative of the positron annihilation events.

11. The apparatus of claim 10 wherein the apparatus includes a radiation sensitive detector;

means for storing temporal resolution data indicative of a temporal resolution at a plurality of locations on the radiation sensitive detector.

12. The apparatus of claim 10 including a pixelated scintillator.

13. The apparatus claim 10 including a scintillator and a silicon photomultiplier in optical communication with the scintillator.

14. A non-transitory computer readable storage medium containing instructions which, when executed by a computer, cause the computer to carry out a method comprising the steps of:

obtaining second order temporal data for a plurality of positron annihilation events along parallel lines of response, the second order temporal data including at least first and second different values;

using the second order temporal data to reconstruct image data indicative of the plurality of positron annihilation events.

15. The non-transitory computer readable storage medium of claim 14 wherein the method includes obtaining list mode data indicative of the plurality of events.

16. The non-transitory computer readable storage medium of claim 14 wherein the method includes using second order temporal data to estimate a location of a positron annihilation event along a line of response.

17. The non-transitory computer readable storage medium of claim 14 wherein the method includes determining a location of a line of response of a positron annihilation event and using the determined location to obtain second order temporal data for the event.

18. The non-transitory computer readable storage medium of claim 14 wherein the method includes measuring at least one of an energy and a depth of interaction for a positron annihilation event; using the at least one of the measured energy and the measured depth of interaction to obtain second order temporal data for the event.

19. The non-transitory computer readable storage medium of claim 14 wherein the method includes obtaining first order temporal data for a plurality of positron annihilation events, the first order temporal data including at least first and second different values; using the first order temporal data to reconstruct image data indicative of the positron annihilation events.

20. The non-transitory computer readable storage medium of claim 14 wherein positron annihilation events are detected using a positron emission tomography scanner and wherein the step of obtaining includes obtaining second order temporal resolution data which is based on a measured temporal resolution of the scanner.

21. The non-transitory computer readable storage medium of claim 14 wherein obtaining second order temporal data includes obtaining second order temporal data from a memory.

22. An apparatus including:

a gamma radiation sensitive detector;

a coincidence detector operatively connected to the radiation sensitive detector;

a memory containing data obtained prior to a scan indicative of varying temporal resolutions of the detector at a plurality of locations on a radiation sensitive face of the detector;

a reconstructor operatively connected to the coincidence detector and the memory, wherein the reconstructor uses a list mode reconstruction technique and the varying temporal resolution data from the memory to generate image data indicative of positron annihilation events, wherein the positron annihilation events are along lines of response parallel to one another and are identified by the coincidence detector.

23. The apparatus of claim 22 wherein the memory contains data indicative of a temporal resolution along each of a plurality of lines of response.

* * * * *